(12) United States Patent
Nguyen et al.

(10) Patent No.: US 8,611,859 B2
(45) Date of Patent: Dec. 17, 2013

(54) SYSTEM AND METHOD FOR PROVIDING SECURE NETWORK ACCESS IN FIXED MOBILE CONVERGED TELECOMMUNICATIONS NETWORKS

(75) Inventors: Nhut Nguyen, Richardson, TX (US); Matt Wu, Plano, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 1447 days.

(21) Appl. No.: 11/522,751

(22) Filed: Sep. 18, 2006

(65) Prior Publication Data
US 2008/0070571 A1   Mar. 20, 2008

(51) Int. Cl.
*H04W 4/16* (2009.01)
(52) U.S. Cl.
USPC ........................... 455/411; 380/277; 713/168
(58) Field of Classification Search
USPC .......... 455/410–411, 418–420; 713/168–171, 713/181; 380/44, 46, 270, 277
See application file for complete search history.

(56) References Cited

U.S. PATENT DOCUMENTS

| | | | | |
|---|---|---|---|---|
| 5,974,312 A * | 10/1999 | Hayes et al. | ................... | 455/419 |
| 6,711,400 B1 * | 3/2004 | Aura | ............................ | 455/411 |
| 7,350,076 B1 * | 3/2008 | Young et al. | ................... | 713/169 |
| 7,793,105 B2 * | 9/2010 | Korkishko et al. | ............ | 713/175 |
| 8,056,117 B2 * | 11/2011 | Jung et al. | ......................... | 726/2 |
| 2004/0139320 A1 * | 7/2004 | Shinohara | ..................... | 713/168 |
| 2004/0221154 A1 * | 11/2004 | Aggarwal | ...................... | 713/151 |
| 2005/0193199 A1 * | 9/2005 | Asokan et al. | ................ | 713/168 |
| 2005/0266826 A1 * | 12/2005 | Vlad | .............................. | 455/410 |
| 2007/0206527 A1 * | 9/2007 | Lo et al. | ........................ | 370/328 |
| 2007/0234432 A1 * | 10/2007 | Korkishko et al. | ............. | 726/27 |
| 2009/0287922 A1 * | 11/2009 | Herwono et al. | ............ | 713/155 |

FOREIGN PATENT DOCUMENTS

WO   WO 2004/017617   *   2/2004   ............. H04M 3/16

* cited by examiner

*Primary Examiner* — Kamran Afshar
*Assistant Examiner* — Khawar Iqbal

(57) ABSTRACT

The present disclosure relates generally to systems and methods for providing secure network access in fixed mobile converged telecommunications systems. In one example, a method includes establishing, by a fixed access device, a connection with a mobile terminal over an air interface. The fixed access device may also establish a limited channel with a service provider network via a broadband interface. The limited channel is restricted to messages meeting one or more criterion. The mobile terminal may be authenticated with the service provider network via the limited channel using authentication information associated with the mobile terminal, and the service provider network has a preexisting relationship with the mobile terminal. A secure channel may be established between the fixed access device and the service provider network after the mobile terminal is authenticated. The secure channel may enable the mobile terminal to communicate with the service provider network using messages not meeting the criterion.

20 Claims, 7 Drawing Sheets

SYSTEM AND METHOD FOR PROVIDING SECURE NETWORK ACCESS IN FIXED MOBILE CONVERGED TELECOMMUNICATIONS NETWORKS

BACKGROUND

In some communication networks, a mobile terminal may be able to use services accessed through a fixed access device. For example, in a fixed mobile converged telecommunications network, a mobile terminal may switch from direct wireless connectivity to a service provider network to indirect connectivity through a fixed access device that is within the range of the mobile terminal. The fixed access device may be located in a residence or other building and may provide the mobile terminal with connectivity to a service provider network. An example of such a fixed access device is a residential gateway that has a broadband connection to the Internet and also provides a radio link to the mobile terminal.

An issue that should be addressed when using such a fixed access device is the need to provide secure network access between the mobile terminal and the service provider network. Generally, a secure channel is established directly between the fixed access device and the service provider network, which requires that the fixed access device be trusted by the network. This trust is typically achieved, for example, by means of authentication using secure credentials stored within the fixed access device. However, the storage of secure credentials in the fixed access device and the establishment of a trust relationship directly between the fixed access device and the service provider network may open the service provider network to possible security breaches if the fixed access device's credentials are abused. Furthermore, this approach may require the provisioning of credentials to the fixed access device and this may necessitate the intervention of customer service personnel. Thus, there is a need for innovative techniques to address these and similar issues.

SUMMARY

In one embodiment, a method comprises establishing, by a fixed access device, a connection with a mobile terminal over an air interface. The fixed access device establishes a limited channel with a service provider network via a broadband interface, wherein the limited channel is restricted to messages needed for authenticating the mobile terminal in the service provider network. The mobile terminal is authenticated with the service provider network via the limited channel using authentication information associated with the mobile terminal, wherein the service provider network has a preexisting relationship with the mobile terminal. A secure channel is established between the fixed access device and the service provider network after authenticating the mobile terminal, wherein the secure channel is not restricted to messages needed for authenticating the mobile terminal in the service provider network.

In another embodiment, a method comprises establishing, by a service provider network configured to provide a communication service to a mobile terminal, a limited channel with a fixed access device via a broadband network, wherein the limited channel is restricted to messages meeting at least one criterion. The service provider network receives, via the limited channel, authentication information associated with the mobile terminal, wherein the service provider network has a preexisting relationship with the mobile terminal. A determination is made as to whether the authentication information is valid. The service provider network establishes a secure channel with the fixed access device via the broadband network if the authentication information is valid, wherein the secure channel enables the mobile terminal to communicate with the service provider network using messages not meeting the at least one criterion.

In still another embodiment, a method comprises establishing, by a fixed access device, a connection with a mobile terminal over an air interface. The fixed access device establishes a limited channel with a service provider network via a broadband interface, wherein the limited channel is restricted to messages meeting at least one criterion. Authentication information is passed from the mobile terminal to the service provider network through the fixed access device. The fixed access device receives a temporary credential from the service provider network and a secure channel is established between the fixed access device and the service provider network using the temporary credential, wherein the secure channel enables the mobile terminal to communicate with the service provider network using messages not meeting the at least one criterion.

In yet another embodiment, a device comprises a wireless interface configured to couple the device with a mobile terminal, a broadband interface configured to couple the device with a broadband network, a processor configured to process a plurality of executable instructions, a memory configured to store the plurality of executable instructions, and the plurality of executable instructions. The instructions include instructions for establishing a connection with the mobile terminal over the wireless interface and establishing a limited channel with a service provider network via the broadband interface, wherein the limited channel is restricted to messages needed for authenticating the mobile terminal in the service provider network. The instructions also include instructions for passing authentication information from the mobile terminal to the service provider network and establishing a secure channel with the service provider network after the mobile terminal is authenticated by the service provider network, wherein the secure channel enables the mobile terminal to communicate with the service provider network using messages not needed for authenticating the mobile terminal in the service provider network.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
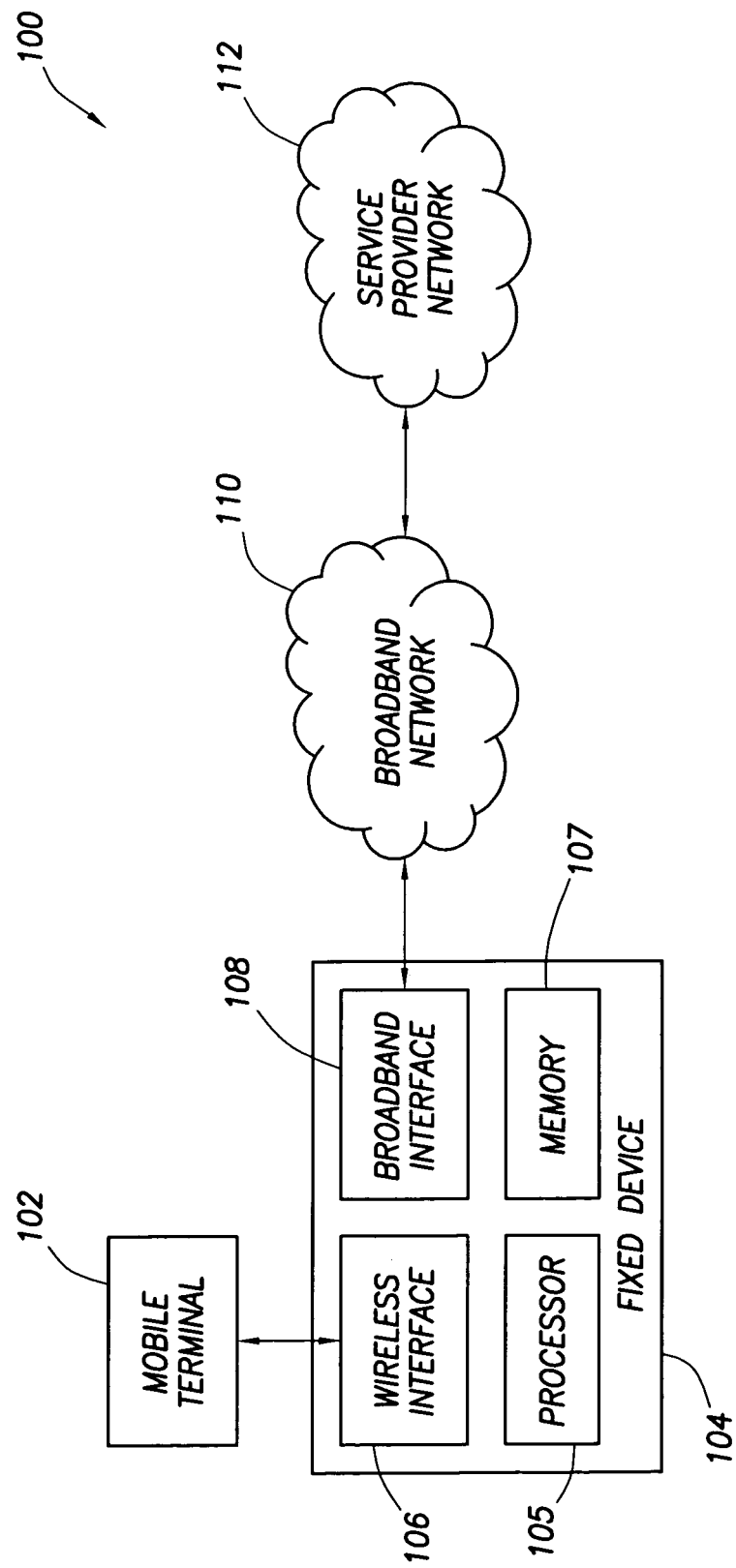
FIG. 1 is a block diagram of one embodiment of a system that may be used to provide secure access for a mobile terminal to a service provider network via a fixed access device.

It is to be understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, a system 100 is illustrated that may be used to provide secure access to a mobile terminal 102. In the present example, the mobile terminal 102 may be a cellular handset or other mobile device, such as a laptop, personal digital assistant, or pager. A fixed access device 104 may be coupled to the mobile terminal 102 via a wireless interface 106 and to a broadband network 110 via a broadband interface 108. A processor 105 may execute instructions stored in a memory 107 to receive, process, and send communications via the wireless and broadband interfaces 106 and 108. It is understood that the wireless interface 106, broadband interface 108, processor 105, and memory 107 may be single or multiple components, and may be distributed in some embodiments. For example, the memory 107 may actually include multiple hard disks, flash drives, or other computer readable media, and may include memory positioned outside of the fixed access device 104. Accordingly, it is understood that the illustrated configuration of the fixed access device 104 is for purposes of example only and is not intended to be limiting.

The broadband network 110 may be coupled to a service provider network 112. The service provider network 112 may typically provide wireless services to the mobile terminal 102. For example, the mobile terminal 102 may be registered within the service provider network 112 pursuant to a service contract, and the service provider network 112 may include identification information corresponding to the mobile terminal. The fixed access device 104 may establish secure network access between the mobile terminal 102 and the service provider network 112.

In a conventional system, the fixed access device 104 generally needs to establish a trusted relationship with the service provider network 112 before the secure network access can be provided. To accomplish this, the fixed access device 104 would typically establish a secure channel between the fixed access device and the service provider network 112 using an authentication process. To perform such authentication, the fixed access device 104 may be equipped with secure credentials that are presented to the service provider network 112. The service provider network 112 may establish the secure channel based on the authenticity of the secure credentials presented by the fixed access device 104. However preparing, provisioning, and managing the secure credentials for the fixed access device 104 may increase manufacturing and operational costs of the fixed access device. For example, secure credentials need to be generated and stored within the fixed access device 104 either during manufacturing or later. From an operational standpoint, a customer care representative may be needed to activate the fixed access device 104 and/or to solve issues related to failure of the fixed access device to properly authenticate. In addition, credentials stored on the fixed access device 104 may be compromised (e.g., hacked), which may lead to security breaches in the service provider network 112.

In the present embodiment, the fixed access device 104 may establish the secure channel either without the use of secure authentication credentials stored within the fixed access device or without the use of any authentication credentials (e.g., the fixed access device may contain no credentials). As will be described below in greater detail, this may be accomplished by establishing a limited channel prior to establishing the secure channel.

Figure 2:
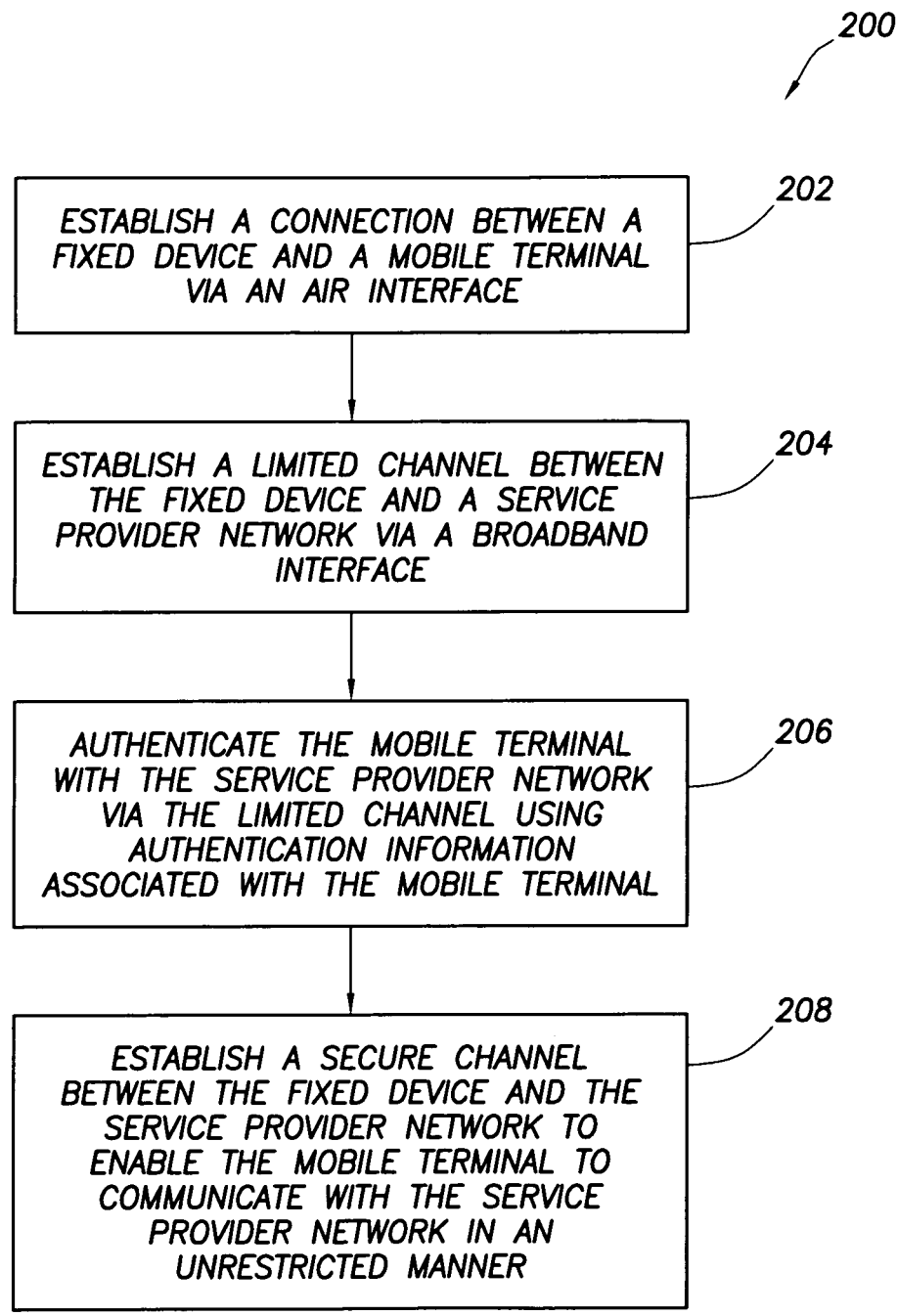
FIG. 2 is a flowchart illustrating one embodiment of a method for providing secure access for a mobile terminal to a service provider network via a fixed access device that may be used in the system of FIG. 1.

Referring to FIG. 2, in one embodiment, a method 200 may be used to provide secure access between a mobile terminal (e.g., the mobile terminal 102 of FIG. 1) and a service provider network (e.g., the service provider network 112 of FIG. 1). In step 202, a connection may be established between the fixed access device 104 and the mobile terminal 102. As this process is known by those of skill in the art, it is not described herein in further detail.

In step 204, a limited channel may be established between the fixed access device 104 and the service provider network 112. It is understood that, although step 204 is shown as occurring after step 202, step 204 may occur prior to step 202 in some embodiments. In the current embodiment, the limited channel may be restricted in terms of message protocols, message types, and/or in the number of messages that may be exchanged. For example, the limited channel may be restricted to messages needed to establish a channel for authentication of the mobile terminal 102 and messages needed to authenticate the mobile terminal (step 206). Other messages (e.g., messages not needed to establish the channel or for authentication) may be rejected.

In step 206, the mobile terminal 102 may send authentication information associated with the mobile terminal to the service provider network 112 via the limited channel. The authentication information may be identical or similar to that used by the mobile terminal 102 when wirelessly authenticating directly with the service provider network. By authenticating the mobile terminal 102, the service provider network 112 also authenticates the fixed access device 104.

In step 208, once the mobile terminal 102 is authenticated by the service provider network 112, a secure channel may be established between the fixed access device 104 and the service provider network. The secure channel, which may not be restricted like the limited channel (e.g., no restrictions on message protocols, types, or number), may then be used to provide access to the service provider network 112 for the mobile terminal 102. In some embodiments, the secure channel may be totally unrestricted, while in other embodiments the secure channel may be restricted to certain message protocols and/or types, but may be restricted to a lesser extent than the limited channel.

Accordingly, the limited channel enables the fixed access device 104 to communicate with the service provider network 112 in a temporary and restricted manner in order to authenticate with the service provider network using the mobile terminal's authentication information that is already known to the service provider network. In this manner, a secure channel may be established between the fixed access device 104 and the service provider network 112 without the need for authentication credentials stored in the fixed access device or the intervention of a customer service person. As the fixed access device 104 is not capable of opening a secure channel without the credentials of the mobile terminal 102, management and security of the fixed access device may be simplified. Furthermore, possible attacks on the service provider network 112 via the fixed access device 104 may be limited by regulating the restrictions imposed on the limited channel.

Figure 3:
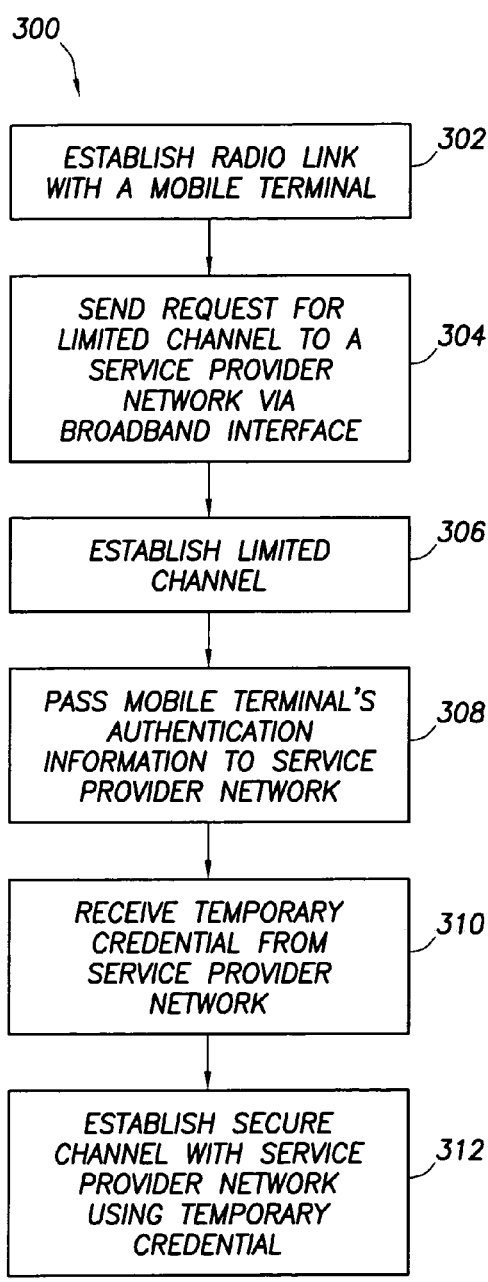
FIG. 3 is a flowchart illustrating one embodiment of a method that may be used by a fixed access device in the system of FIG. 1 to provide secure access for a mobile terminal to a service provider network.

Referring to FIG. 3, in one embodiment, a method 300 may be used by a fixed access device (e.g., the fixed access device 104 of FIG. 1) to establish a limited channel and then a secure channel with a service provider network (e.g., the service provider network 112 of FIG. 1) for use by a mobile terminal (e.g., the mobile terminal 102 of FIG. 1).

In step 302, a connection (e.g., a radio link) is established between the fixed access device 104 and the mobile terminal 102. As this process is known by those of skill in the art, it is not described herein in further detail. In step 304, the fixed access device 104 may send a request for a limited channel to the service provider network 112. The request may contain various parameters for the limited channel (e.g., Internet Protocol (IP) address and port number of the fixed access device 104 to be used for the limited channel). In some embodiments, the request may explicitly identify that it is for a limited channel. In other embodiments, the fixed access device 104 may request a channel and the service provider network 112 may identify the request as asking for a limited channel because, for example, no authentication credentials are presented by the fixed access device and/or no channel is currently established with the fixed access device (or no channel having the request's IP address and port number is currently established with the fixed access device).

In step 304, the limited channel may be established. In the current embodiment, the limited channel may be limited in terms of message protocols, message types, and/or in the number of messages that may be exchanged. Generally, the limited channel may be configured to permit only messages needed to establish a connection and authenticate a mobile terminal. Furthermore, the number of messages may be limited, for example, to the number of messages needed for the authentication process plus a defined number of repeats (i.e., to allow for lost messages).

In step 306, the limited channel may be established between the fixed access device 104 and the service provider network 112. It is understood that, although steps 304 and 306 are shown as occurring after step 302, step 304 and/or step 306 may occur prior to step 302 in some embodiments.

In step 308, the fixed access device 104 passes the mobile terminal's authentication information to the service provider network 112 via the limited channel. If the service provider network 112 authenticates the mobile terminal 102, it may generate a temporary credential (e.g., a shared key) that is received by the fixed access device 104 in step 310. The fixed access device 104 may then establish the secure channel with the service provider network 112 using the temporary credential in step 312. In other embodiments, the fixed access device 104 or the service provider network 112 may initiate establishment of the secure channel without generating a temporary credential.

Figure 4:
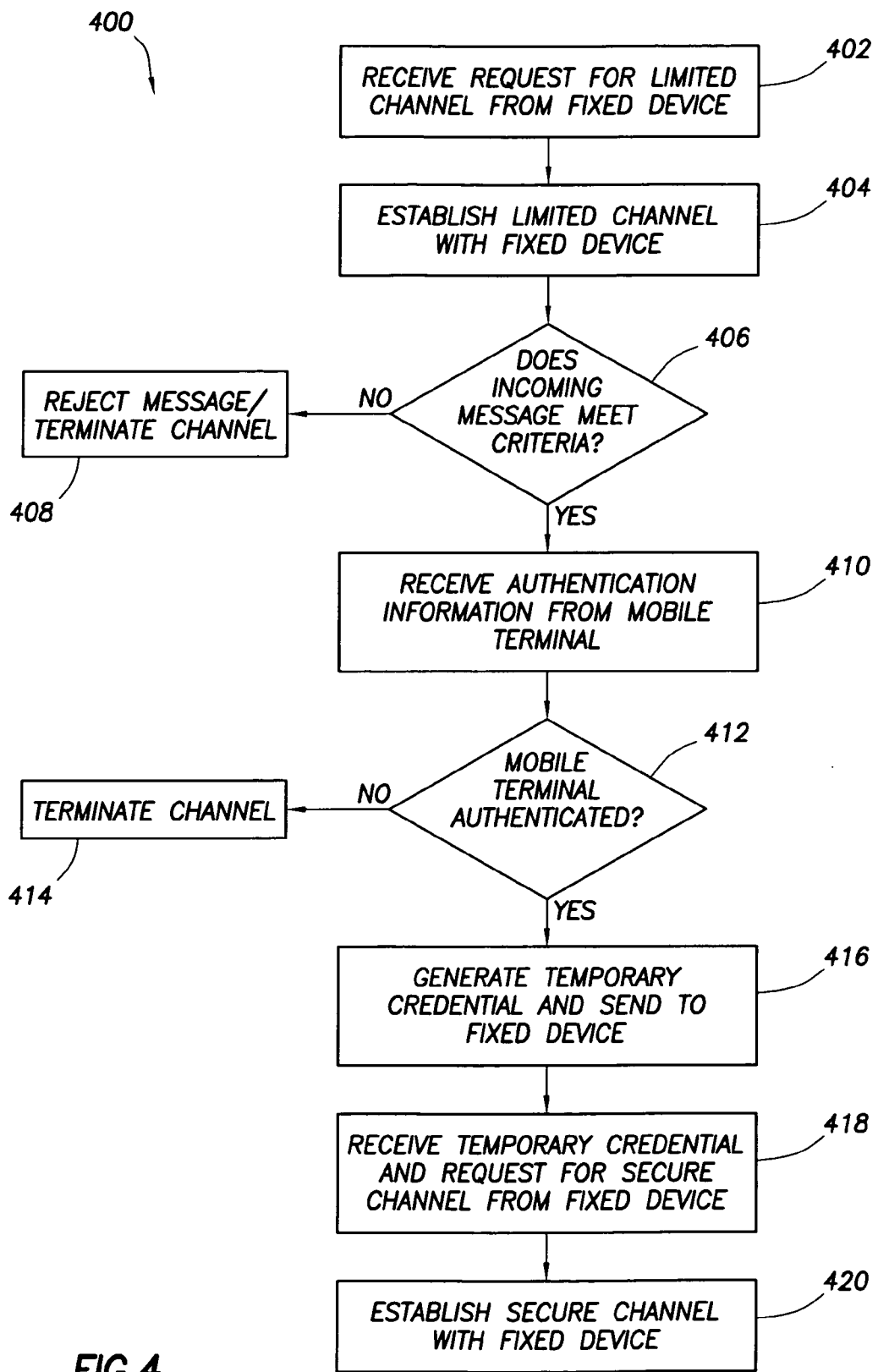
FIG. 4 is a flowchart illustrating one embodiment of a method that may be used by a service provider network in the system of FIG. 1 to provide secure access for a mobile terminal via a fixed access device.

Referring to FIG. 4, in another embodiment, a method 400 may be used by a service provider network (e.g., the service provider network 112 of FIG. 1) to establish a limited channel and then a secure channel with a fixed access device (e.g., the fixed access device 104 of FIG. 1) for use by a mobile terminal (e.g., the mobile terminal 102 of FIG. 1).

In step 402, the service provider network 112 may receive a request from the fixed access device 104 for a limited channel. The request may include various parameters, such as an IP address and port of the fixed access device 104. In some embodiments, the request may explicitly identify that it is for a limited channel. In other embodiments, the fixed access device 104 may request a channel and the service provider network 112 may understand that the request is for a fixed channel because, for example, no authentication credentials are presented by the fixed access device and/or no channel is currently established with the fixed access device (or no channel having the request's IP address and port number is currently established with the fixed access device).

In step 404, the service provider network 112 may establish the limited channel with the fixed access device 104. The limited channel may be restricted to messages meeting defined criteria, such as permitted message protocols, permitted message types, and/or a maximum number of messages that may be exchanged. In some embodiments, the service provider network 112 may terminate the limited channel if a defined period of time expires without receiving further communications from the fixed access device 104.

In step 406, a determination may be made as to whether an incoming message received via the limited channel established with the fixed access device 104 meets the criteria imposed on the limited channel. If the incoming message does not meet the criteria, the method 400 may move to step 408 where the message may be rejected and/or the limited channel may be terminated. In some embodiments, the service provider network 112 may notify the fixed access device 104 of the rejection, while other embodiments may provide no such notification.

If the incoming message does meet the criteria, the method 400 continues to step 410 and receives authentication information from the mobile terminal 102 via the fixed access device 104. In the present example, the service provider network 112 may include the ability to recognize and authenticate the mobile terminal 102 using processes that may be similar or identical to existing authentication methods in second generation (2G) and third generation (3G) telecommunication systems. For example, the service provider network 112 may be a cellular network within which the mobile terminal 102 is registered. If the service provider network 112 is not able to authenticate the mobile terminal 102, the service provider network may contact another network with which the mobile terminal is registered. For example, if the mobile terminal 102 is registered in a home network other than the service provider network 112 (e.g., the mobile terminal is roaming), the service provider network may contact the home network to authenticate the mobile terminal. As such intra-network and inter-network authentication processes are well known to those of skill in the art, they are not described in further detail herein.

In step 412, a determination may be made as to whether the mobile terminal 102 has been authenticated. If the authentication failed, the method moves to step 414, where it may terminate the limited channel or take other action (e.g., repeat the authentication process). If the mobile terminal 102 was successfully authenticated by the service provider network 112, the service provider network knows that it can trust the fixed access device 104 and the method 400 continues to step 416.

In step 416, the service provider network 112 may generate a temporary credential and send the temporary credential to the fixed access device 104. The temporary credential may, for example, be limited to a certain period of time and may be used to ensure that a secure channel requested by the fixed access device 104 is used for the mobile terminal 102 (e.g., the temporary credential may be tied to the mobile terminal's authentication information). In step 418, the service provider network 112 may receive the temporary credential and a request for a secure channel from the fixed access device 104 and, in step 420, the secure channel may be established between the service provider network and the fixed access device (assuming that the temporary credential is authenticated). The secure channel may be relatively unrestricted compared to the limited channel in terms of permitted message protocols, message types, and the number of messages allowed. For example, the secure channel may be a substantially unlimited channel that provides functionality similar to what would be provided by a wireless channel that might be established directly between the mobile terminal 102 and the service provider network 112 (i.e., without the intervening fixed access device 104).

Figure 5:
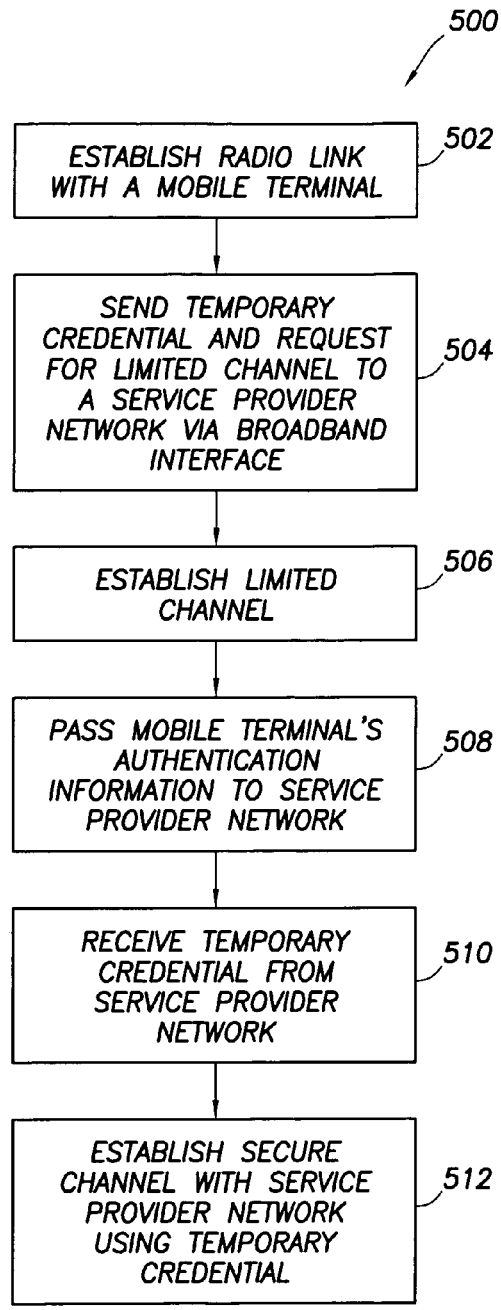
FIG. 5 is a flowchart illustrating another embodiment of a method that may be used by a fixed access device in the system of FIG. 1 to provide secure access for a mobile terminal to a service provider network.

Referring to FIG. 5, in another embodiment, a method 500 may be used by a fixed access device (e.g., the fixed access device 104 of FIG. 1) that includes a temporary stored credential to establish a limited channel and then a secure channel with a service provider network (e.g., the service provider network 112 of FIG. 1) for use by a mobile terminal (e.g., the mobile terminal 102 of FIG. 1).

In step 502, a connection is established between the fixed access device 104 and the mobile terminal 102. As this process is known by those of skill in the art, it is not described herein in further detail.

In step 504, the fixed access device 104 may send a request for a limited channel to the service provider network 112. The request may contain various parameters for the limited channel (e.g., IP address and port number of the fixed access device 104 to be used for the limited channel). In the present embodiment, in addition to the request, the fixed access device 104 may send a temporary credential (e.g., a unique identifier stored in the memory 107 of FIG. 1) to the service provider network 112. The temporary credential may be used as a built-in mechanism for self-verification. For example, the self-verification mechanism may be based on a digest computed from a one-way hashing algorithm that is appended to a serial number associated with the fixed access device 104. The digest may be verified by the service provider network 112 (e.g., by a security gateway at the border of the service provider network) in order for the service provider network to determine if the fixed access device 104 is authorized (e.g., whether the temporary credential presented by the fixed access device represents a valid identifier). This temporary credential may be used to authenticate the fixed access device 104 in order to provide a limited channel to the service provider network 112.

In the current embodiment, the limited channel may be limited in terms of message protocols, message types, and/or in the number of messages that may be exchanged. Generally, the limited channel may be configured to permit only messages needed to authenticate a mobile terminal. Furthermore, the number of messages may be limited to the needed messages plus a defined number of repeats (i.e., to allow for lost messages).

The limited channel established using the temporary credential may be used solely for an authentication process based on credentials stored in the mobile terminal 102. Because the fixed access device's temporary credential is used for a limited time to open a temporary and limited channel that is restricted to authentication, the credential does not need to be secure. For example, hacking or cracking of the temporary credential may open only the limited channel to the service provider network 112, and so may not be worth the effort required to do so.

In step 506, the limited channel may be established between the fixed access device 104 and the service provider network 112. It is understood that, although steps 504 and 506 are shown as occurring after step 502, step 504 and/or step 506 may occur prior to step 502 in some embodiments. Furthermore, the temporary credential may be sent to the service provider network 112 with the request, separately from the request (e.g., before or after sending the request in step 504), and/or prior to establishing the radio link with the mobile terminal in step 502.

In step 508, the fixed access device 104 passes the mobile terminal's authentication information to the service provider network 112 via the limited channel. If the service provider network 112 authenticates the mobile terminal 102, it may generate a temporary credential that is received by the fixed access device 104 in step 510. The fixed access device 104 may then establish the secure channel with the service provider network 112 using the temporary credential in step 512.

Accordingly, using the method 500, the fixed access device 104 may be authenticated in two stages. In the first stage of authentication, the temporary credential associated with the fixed access device 104 may be used to authenticate the fixed access device for the purpose of establishing a limited channel to the service provider network 112. The limited channel may then be used in the second stage of authentication, which may include authentication of the mobile terminal 102 with the service provider network 112 using the mobile terminal's own credentials. The fixed access device 104 may only establish a secure and fully privileged channel with the service provider network 112 after the mobile terminal 102 has been successfully authenticated by the service provider network using the credentials stored in the mobile terminal. Accordingly, compromising the credentials stored in the fixed access device 104 may not open the service provider network 112 to serious security attacks, as the limited channel that can be established using the fixed access device's credentials is restricted.

Figure 6:
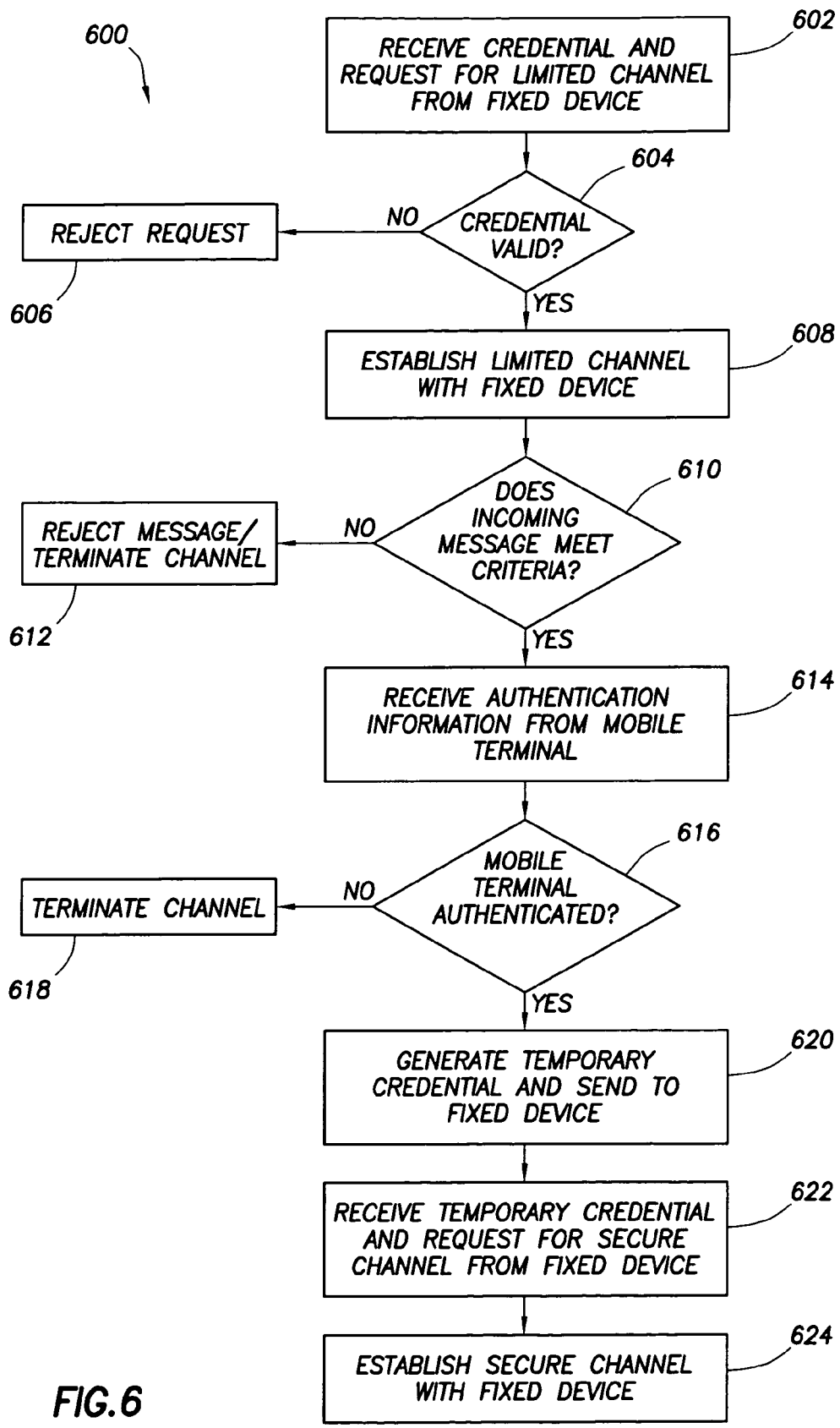
FIG. 6 is a flowchart illustrating another embodiment of a method that may be used by a service provider network in the system of FIG. 1 to provide secure access for a mobile terminal via a fixed access device.

Referring to FIG. 6, in another embodiment, a method 600 may be used by a service provider network (e.g., the service provider network 112 of FIG. 1) to establish a limited channel and then a secure channel with a fixed access device (e.g., the fixed access device 104 of FIG. 1) for use by a mobile terminal (e.g., the mobile terminal 102 of FIG. 1). In the present embodiment, the service provider network 112 may receive and verify a temporary credential from the fixed access device 104 prior to establishing the limited channel.

In step 602, the service provider network 112 may receive a request for a limited channel and a temporary credential from the fixed access device 104. For example, the temporary credential may be based on a digest computed from a one-way hashing algorithm that is appended to a serial number associated with the fixed access device 104. The digest may be verified by the service provider network 112 (e.g., by a security gateway at the border of the service provider network) in order for the service provider network to determine if the fixed access device 104 is authorized (e.g., whether the temporary credential presented by the fixed access device represents a valid identifier). This temporary credential may be used to provide the fixed access device 104 with a limited channel to the service provider network 112.

The request for a limited channel may include various parameters, such as an IP address and port of the fixed access device 104. In some embodiments, the request may explicitly identify that it is for a limited channel. In other embodiments, the fixed access device 104 may request a channel and the service provider network 112 may understand that the request is for a fixed channel because of the temporary authentication credential presented by the fixed access device and/or because no channel is currently established with the fixed access device (or no channel having the request's IP address and port number is currently established with the fixed access device).

In step 604, a determination may be made as to whether the temporary credential presented by the fixed access device 104 is valid. For example, as described above, the temporary credential may be in the form of a digest to be validated. If the temporary credential is not validated, the method 600 may move to step 606, where the request for the limited channel is rejected. If the temporary credential is validated, the method 600 may move to step 608.

In step 608, the service provider network 112 may establish the limited channel with the fixed access device 104. The limited channel may be restricted to messages meeting defined criteria, such as permitted message protocols, permitted message types, and/or a maximum number of messages that may be exchanged. In some embodiments, the service provider network 112 may terminate the limited channel if a defined period of time expires without receiving further communications from the fixed access device 104.

In step 610, a determination may be made as to whether an incoming message received via the limited channel established with the fixed access device 104 meets the criteria imposed on the limited channel. If the incoming message does not meet the criteria, the method 600 may move to step 612 where the message may be rejected and/or the limited channel may be terminated. In some embodiments, the service provider network 112 may notify the fixed access device 104 of the rejection, while other embodiments may provide no such notification.

If the incoming message does meet the criteria, the method 600 continues to step 614 and receives authentication information from the mobile terminal 102 via the fixed access device 104. In the present example, the service provider network 112 may include the ability to recognize and authenticate the mobile terminal 102 using processes that may be similar or identical to existing authentication methods in second generation (2G) and third generation (3G) telecommunication systems. For example, the service provider network 112 may be a cellular network within which the mobile terminal 102 is registered. If the service provider network 112 is not able to authenticate the mobile terminal 102, the service provider network may contact another network with which the mobile terminal is registered. For example, if the mobile terminal 102 is registered in a home network other than the service provider network 112 (e.g., the mobile terminal is roaming), the service provider network may contact the home network to authenticate the mobile terminal. As such intra-network and inter-network authentication processes are well known to those of skill in the art, they are not described in further detail herein.

In step 616, a determination may be made as to whether the mobile terminal 102 has been authenticated. If the authentication failed, the method moves to step 618, where it may terminate the limited channel or take other action (e.g., repeat the authentication process). If the mobile terminal 102 was successfully authenticated by the service provider network 112, the service provider network knows that it can trust the fixed access device 104 and the method 600 continues to step 620.

In step 620, the service provider network 112 may generate a temporary credential (e.g., a shared key) and send the temporary credential to the fixed access device 104. The temporary credential may, for example, be limited to a certain period of time and may ensure that a secure channel requested by the fixed access device 104 is used for the mobile terminal 102. In step 622, the service provider network 112 may receive the temporary credential and a request for a secure channel from the fixed access device 104 and, in step 624, the secure channel may be established between the service provider network and the fixed access device (assuming that the temporary credential is authenticated). The secure channel may be relatively unrestricted compared to the limited channel in terms of permitted message protocols, message types, and the number of messages allowed. For example, the secure channel may be a substantially unlimited channel that provides functionality similar to what would be provided by a wireless channel that might be established directly between the mobile terminal 102 and the service provider network 112 (i.e., without the intervening fixed access device 104).

Accordingly, using the method 600, the fixed access device 104 may be authenticated in two stages. In the first stage of authentication, a credential associated with the fixed access device 104 may be used to authenticate the fixed access device for the purpose of establishing a limited channel to the service provider network 112. The limited channel may then be used in the second stage of authentication, which may include authentication of the mobile terminal 102 with the service provider network 112 using the mobile terminal's own credentials. The fixed access device 104 may only establish a secure and fully privileged channel with the service provider network 112 after the mobile terminal 102 has been successfully authenticated by the service provider network using the credentials stored in the mobile terminal.

Figure 7:
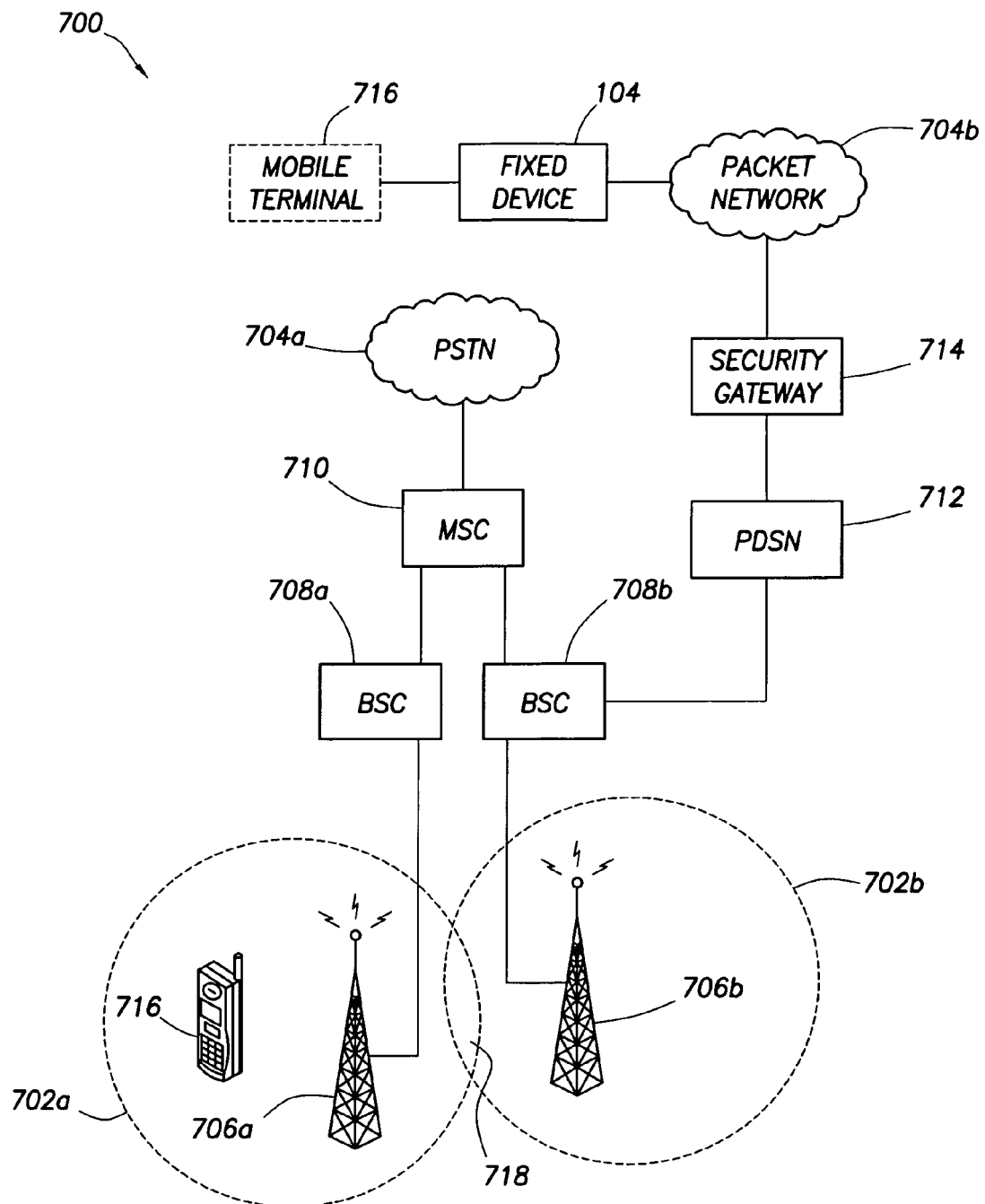
FIG. 7 is a diagram of a more detailed embodiment of the system of FIG. 1.

Referring to FIG. 7, in another embodiment, a communications network 700 illustrates a more detailed example of the system 100 of FIG. 1. In the present example, the network 700 is a CDMA network that may be compatible with a variety of standards including, but not limited to, Interim Standard 95 (IS-95), Interim Standard 2000 (IS-2000) and Universal Mobile Telecommunications System (UMTS). The network 700 may represent other technologies, including Global System for Mobile communication (GSM), and Orthogonal Frequency Division Multiplexing (OFDM). Accordingly, it is understood that the methods of the present disclosure may be performed in networks based on different technologies, such as High Rate Packet Data-based Radio Access Networks (HRPD-based RANs) and that the examples using a CDMA network are for purposes of illustration only. Furthermore, it is understood that various functions performed by the network 700, such as call authentication, pilot signal broadcast, etc., may be either digital or analog, and the network may include circuit switched technology as well as packet based technology.

The network 700 includes a plurality of cells 702a, 702b. In the present example, the network 700 is a wireless network, and may be connected to other wireless and/or wireline networks, such as a Public Switched Telephone Network (PSTN) 704a and a public broadband packet network 704b. Each cell 702a, 702b in the network 700 includes a base station (BS) 706a, 706b, respectively, that are coupled to base station controllers (BSC) 708a, 708b, respectively. A mobile switching center (MSC) 710 may be used to connect the network 700 with other networks such as the PSTN 704a. Although not shown, the base stations 706a and 706b may be coupled to the same BSC, and the BSCs 708a and 708b may be coupled to separate MSCs. The BSC 708b may be coupled to a packet-switched node 712 (e.g., a packet data node such as a packet data serving node (PDSN)) that is coupled to the packet network 704b. A security gateway 714 may be positioned at a border of the network 700 between, for example, the packet-switched node 712 and the packet network 704b. The security gateway 714 may perform authentication functions for the network 700. For example, the security gateway 714 may authenticate the fixed access device 104 (e.g., when the fixed access device is associated with a temporary credential) and/or a mobile terminal 716 (which may be similar or identical to the mobile terminal 102 of FIG. 1).

The network 700 enables a client such as the mobile terminal 716 to communicate with another device (not shown) via the BTS 706a associated with the cell 702a in which the mobile terminal is located. Although illustrated in FIG. 7 as a cellular phone, it is understood that the mobile terminal 702 may be any device capable of wirelessly participating in a communication session, and such devices may include personal digital assistants, portable computers, pagers, and/or cellular phones. The cells 702a, 702b overlap so that the mobile terminal 716 may travel from one cell to another (e.g., from the cell 702a to the cell 702b) while maintaining a communication session. In a handoff region 718 (e.g., the area where the cells 702a, 702b overlap), the mobile terminal 716 may be serviced by both the BTS 706a and the BTS 706b.

When the mobile terminal 716 enters a region serviced by the fixed access device 104, the mobile terminal may switch from its wireless connection to the network 700 to a wireless connection with the fixed access device (illustrated with mobile terminal 716 appearing in dotted lines when coupled to fixed access device 104 in FIG. 7). For example, the fixed access device 104 may be located in an area where direct wireless access between the mobile terminal 716 and the network 700 is difficult or impossible to maintain, such as in a building or at a remote location. Accordingly, the mobile terminal 716 may switch to the fixed access device 104, and the fixed access device may establish a secure connection to the network 700 as previously described. It is understood that, in some examples, the mobile terminal 716 may not switch to the fixed access device 104.

Figure 8:
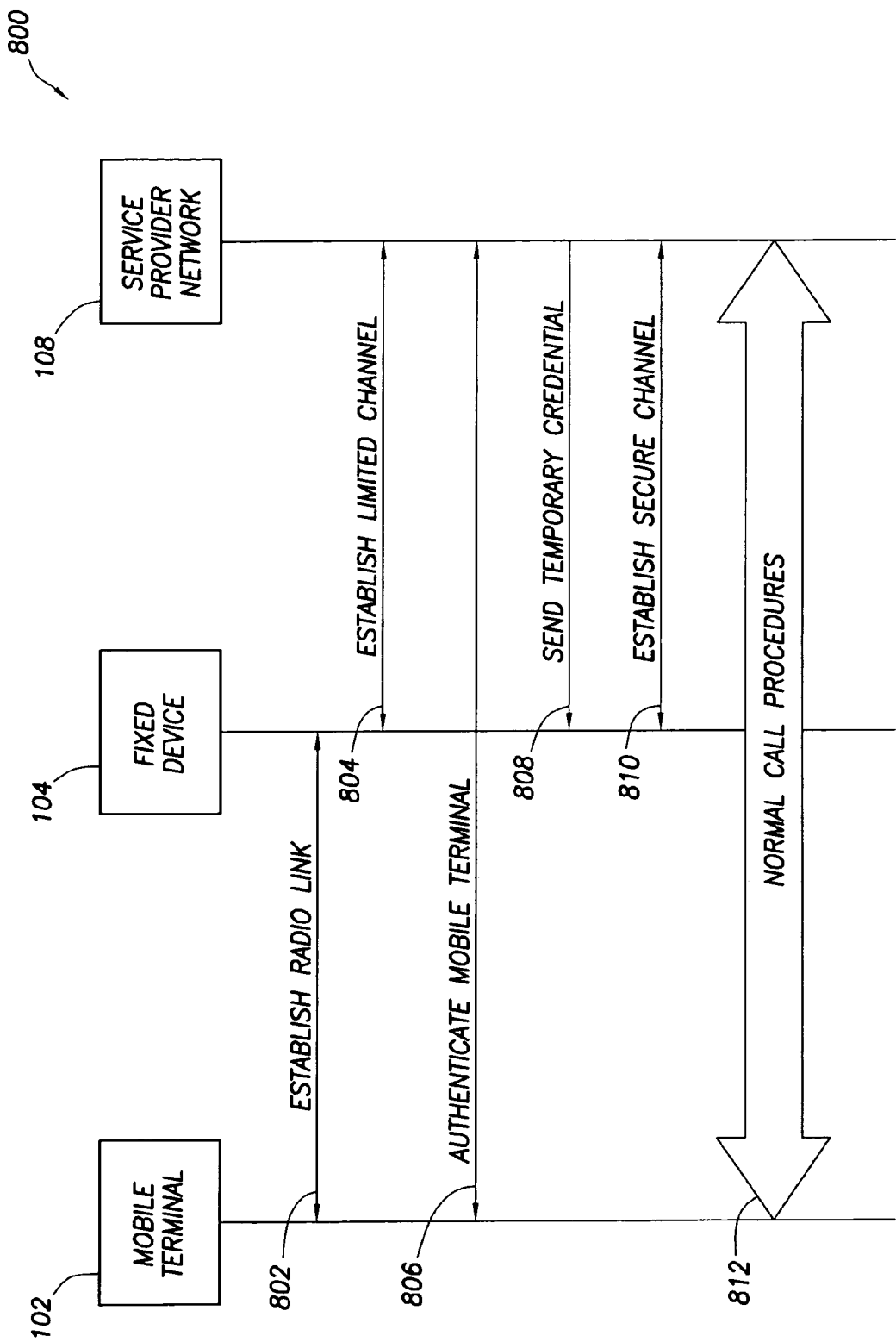
FIG. 8 is a sequence diagram illustrating one possible sequence of messages that may occur within the system of FIG. 1.

Referring to FIG. 8, in another embodiment, a sequence diagram 800 illustrates various messages that may be passed between components of FIG. 1 in order to establish a secure channel for the mobile terminal 102. It is understood that the sequence diagram 800 illustrates the basic function provided by a message and does not provide actual message types or detailed message exchanges. Furthermore, it is understood that the service provider network 112 may include various components to handle different aspects of the channel set up, such as the security gateway 714 of FIG. 7 for authentication functions, but these separate components are not illustrated in FIG. 8.

In step 802, the fixed access device 104 may establish a radio link or other wireless link with the mobile terminal 102. In step 804, a temporary channel may be established between the fixed access device 104 and the service provider network 112. The establishment of the fixed channel may require a credential from the fixed access device 104 (e.g., as described with respect to FIGS. 5 and 6) or may be established without such a credential (e.g., as described with respect to FIGS. 3 and 4). In step 806, the mobile terminal 102 may be authenticated by the service provider network 112 via the limited channel. In step 808, upon authentication of the mobile terminal 102, the service provider network 112 may send a temporary credential to the fixed access device 104, which may be used to establish a secure channel between the fixed access device and service provider network in step 810. In step 810, the mobile terminal 102 may communicate with the service provider network 112 via the secure channel using normal call procedures.

Although only a few exemplary embodiments of this disclosure have been described in details above, those skilled in the art will readily appreciate that many modifications are possible in the exemplary embodiments without materially departing from the novel teachings and advantages of this disclosure. Also, features illustrated and discussed above with respect to some embodiments can be combined with features illustrated and discussed above with respect to other embodiments. For example, various steps from different flow charts may be combined, performed in an order different from the order shown, or further separated into additional steps. Furthermore, steps may be performed by network elements other than those disclosed. Accordingly, all such modifications are intended to be included within the scope of this disclosure.

What is claimed is:

1. A method comprising:
    establishing, by a fixed access device, a connection with a mobile terminal over an air interface;
    establishing, by the fixed access device, a limited channel with a service provider network via a broadband interface, wherein the limited channel comprises a non-secure channel that is limited, by the service provider network, to messages needed for authenticating the mobile terminal in the service provider network;
    authenticating the mobile terminal with the service provider network via the limited channel using authentication information associated with the mobile terminal, wherein the service provider network has a preexisting relationship with the mobile terminal; and
    establishing a secure channel between the fixed access device and the service provider network after authenticating the mobile terminal, wherein the secure channel is not restricted to messages needed for authenticating the mobile terminal in the service provider network.

2. The method of claim 1, further comprising sending a temporary credential associated with the fixed access device to the service provider network to establish the limited channel.

3. The method of claim 2, wherein the temporary credential is a digest associated with an identification number of the fixed access device.

4. The method of claim 1, wherein establishing the secure channel includes:
    generating a temporary shared key by the service provider network;
    sending the temporary shared key to the fixed access device; and
    using the temporary shared key to establish the secure channel.

5. The method of claim 1, further comprising rejecting, by the service provider network, a message received via the limited channel that is not needed for authenticating the mobile terminal in the service provider network.

6. The method of claim 1, further comprising terminating the limited channel by the service provider network if a message received via the limited channel is not needed for authenticating the mobile terminal in the service provider network.

7. The method of claim 1, further comprising terminating the limited channel by the service provider network if the mobile terminal is not authenticated within a predefined time period.

8. A method comprising:
- establishing, by a service provider network configured to provide a communication service to a mobile terminal, a limited channel with a fixed access device via a broadband network, wherein the limited channel comprises a non-secure channel that is limited, by the service provider network, to messages needed for authenticating the mobile terminal in the service provider network;
- receiving, by the service provider network via the limited channel, authentication information associated with the mobile terminal, wherein the service provider network has a preexisting relationship with the mobile terminal;
- determining whether the authentication information is valid; and
- establishing, by the service provider network, a secure channel with the fixed access device via the broadband network if the authentication information is valid, wherein the secure channel enables the mobile terminal to communicate with the service provider network using messages not needed for authenticating the mobile terminal in the service provider network.

9. The method of claim 8, wherein no authentication credential is received by the service provider network from the fixed access device prior to establishing the limited channel.

10. The method of claim 8, further comprising:
- receiving an authentication credential from the fixed access device prior to establishing the limited channel;
- determining whether the authentication credential is valid; and
- establishing the limited channel only if the authentication credential is valid.

11. The method of claim 8, further comprising rejecting, by the service provider network, a message not needed for authenticating the mobile terminal in the service provider network that is received via the limited channel.

12. The method of claim 8, further comprising terminating the limited channel by the service provider network if a message received via the limited channel does not need authentication of the mobile terminal.

13. The method of claim 8, wherein establishing the secure channel includes generating a temporary shared key by the service provider network and using the temporary shared key by the fixed access device to establish the secure channel.

14. A method comprising:
- establishing, by a fixed access device, a connection with a mobile terminal over an air interface;
- establishing, by, the fixed access device, a limited channel with a service provider network via a broadband interface, wherein the limited channel comprises a non-secure channel that is limited, by the service provider network, to messages needed for authenticating the mobile terminal in the service provider network;
- passing authentication information from the mobile terminal to the service provider network through the fixed access device;
- receiving, by the fixed access device, a temporary credential by the service provider network; and
- establishing a secure channel between the fixed access device and the service provider network using the temporary credential, wherein the secure channel enables the mobile terminal to communicate with the service provider network using messages not needed for authenticating the mobile terminal in the service provider network.

15. The method of claim 14, further comprising:
- receiving, by the fixed access device, an initiation message from the mobile terminal indicating that the mobile terminal is requesting access to the service provider network; and
- sending a request from the fixed access device to the service provider network to establish the limited channel in response to the initiation message.

16. The method of claim 14, wherein no authentication information is sent by the fixed access device to the service provider network prior to establishing the limited channel.

17. The method of claim 14, further comprising sending, by the fixed access device, authentication information to the service provider network prior to establishing the limited channel.

18. A device comprising:
- a wireless interface configured to couple the device with a mobile terminal;
- a broadband interface configured to couple the device with a broadband network;
- a processor configured to process a plurality of executable instructions;
- a memory configured to store the plurality of executable instructions; and
- the plurality of executable instructions including instructions for:
  - establishing a connection with the mobile terminal over the wireless interface;
  - establishing a limited channel with a service provider network via the broadband interface, wherein the limited channel comprises a non-secure channel that is limited, by the service provider network, to messages needed for authenticating the mobile terminal in the service provider network;
  - passing authentication information from the mobile terminal to the service provider network; and
  - establishing a secure channel with the service provider network after the mobile terminal is authenticated by the service provider network, wherein the secure channel enables the mobile terminal to communicate with the service provider network using messages not needed for authenticating the mobile terminal in the service provider network.

19. The device of claim 18, further comprising:
at least one authentication credential stored in the memory; and
instructions for sending the at least one authentication credential to the service provider network before to establishing the limited channel.

20. The device of claim 18, further comprising instructions for:
- receiving temporary authentication information from the service provider network; and using the temporary authentication information when establishing the secure channel.

* * * * *